(12) United States Patent
Chen

(10) Patent No.: US 7,426,592 B2
(45) Date of Patent: Sep. 16, 2008

(54) MANAGEMENT FUNCTION SETTING METHOD FOR INTELLIGENT PLATFORM MANAGEMENT INTERFACE

(75) Inventor: Chih-Wei Chen, Taipei (TW)

(73) Assignee: Inventec Corporation, Taipei (TW)

( * ) Notice: Subject to any disclaimer, the term of this patent is extended or adjusted under 35 U.S.C. 154(b) by 112 days.

(21) Appl. No.: 11/396,077

(22) Filed: Mar. 30, 2006

(65) Prior Publication Data

US 2007/0234124 A1 Oct. 4, 2007

(51) Int. Cl.
*G06F 13/00* (2006.01)
(52) U.S. Cl. .............................. 710/104; 710/8; 713/1; 713/2
(58) Field of Classification Search ............ 710/8, 710/10, 14, 104; 713/1, 2; 709/217, 219
See application file for complete search history.

(56) References Cited

U.S. PATENT DOCUMENTS 5,544,138 A * 8/1996 Bajorek et al. ........... 369/53.42
2004/0006690 A1 * 1/2004 Du et al. ..................... 713/2
2004/0010576 A1 * 1/2004 Hyndman et al. ......... 709/223
2006/0206286 A1 * 9/2006 Mugunda et al. ......... 702/182
2007/0055793 A1 * 3/2007 Huang et al. ................ 710/8

* cited by examiner

*Primary Examiner*—Glenn A Auve
(74) *Attorney, Agent, or Firm*—Jianq Chyun IP Office

(57) ABSTRACT

A management function setting method for dynamically setting a plurality of management functions of an intelligent platform management interface (IPMI) of a computer system, allows a system manager to obtain a system status through the IPMI, and set customized commands for selecting needed function modules for execution. Through the establishment of an IPMI OEM command, the method is capable of enabling or disabling management functions and obtaining function status flags of the management functions. Moreover, by determining the need of users, the method executes the IPMI OEM command to set the function status flags of the management functions, so as to fast, correctly and efficiently set the management functions and satisfy the demands of the users.

5 Claims, 1 Drawing Sheet

MANAGEMENT FUNCTION SETTING METHOD FOR INTELLIGENT PLATFORM MANAGEMENT INTERFACE

BACKGROUND OF THE INVENTION

1. Field of the Invention

This invention relates to a management function setting method for an intelligent platform management interface (IPMI), and more particularly, to a management function setting method applicable to a computer system having the IPMI for allowing a system manager to enable or disable a plurality of the management functions of the IPMI by changing function status flags of the management functions with IPMI OEM commands.

2. Description of Related Art

With the rapid development of information and electronic technologies, information apparatus manufacturers try their best to provide a variety of remote services, such as an intelligent platform management interface (IPMI), to satisfy the demands required by users. The IPMI can be used to monitor a monitor's varieties of physical properties, such as temperature, working voltage, fan status, and power supply status, and provide messages for system management, recovery and information management. Such a number of functions has become standard functions of a server. In order to provide a plurality of functions to users, the IPMI of the server is provided with a variety of instruction functions. When the users are performing an actuation system, the functions are read and actuated by firmware one by one. Network application structure servers, Blade servers and industrial control computers are three kinds of equipments having adopted the IPMI, and are usually applied to an Internet service system, a telecommunication system and any other systems needing remote management.

In Internet application, the system stops providing services frequently because of a variety of causes. A common solution is to reset the server to determine the malfunction causes or solve the malfunctions. The IPMI can repair the malfunction automatically and efficiently. Or if a hardware is malfunctioned, monitoring functions provided by the IPMI can inform a system manager with alarm signals; or actuate system automatically adjusting functions simultaneously to elongate the working of the server before the system manager performs manual malfunction checks; or when the server system is malfunctioned due to malfunctioned software, a surveillance system externally connected to the IPMI can help the system manager to realize the working situation of the malfunction server hardware, so as to determine the malfunctioned causes and adopt remote hardware to recover or reset functions to reset the server. The function promotes the practicability of the server.

As to the telecommunication system, the system needs to be provided with a lot of automatic service and monitor equipments, so as to ensure to operate continuously. Since adopting special equipments and special software, the system has a high cost. Besides, due to the improvement of new technologies and new application demands, the conventional equipments are more and more hard to satisfy the demands. Moreover, the products do not have unified functions, and can not form a unified and concentrated system monitor management platform. However, the server of the IPMI technology has the capability to enable the telecommunication system to improve the equipment practicability, and reduces the processing cost. A baseboard management controller (BMC) can operate independently with a central processing unit (CPU) of the server. That is, when the server is malfunctioned due to a malfunctioned operating system or software, a network working mode of the BMC performs hardware resetting, power-off or reset processes on the server, so as to restore the system to operate again.

Among the systems needing remote management, distributed remote management is always a united difficult point of varieties of industrial control application systems: complicated management, high cost, hard to implement. When place in an environment without personnel to surveillance, a bank automatic service terminal stops providing services occasionally due to unknown reasons such as software operation malfunctioned. A conventional method to solve the problem is to dispatch people to restart the system, or install surveillance and management software in its application system to coordinate the management works. However, the method is hard to implement, and is helpless when the system is crashed due to the malfunctioned system software, because the system has to rely on a system CPU and operating system to operate. The BMC of the IPMI can get rid of the control of the CPU and work independently. IN a network working mode, the BMC can be enabled remotely to restart its host. Even the remote terminal hardware's restarting can provide necessary technical conditions to function automatic recovery or remote software automation installation, so as to improve the practicability of this kind of equipments.

However, the demands of different functions are getting more and more. When a system provider performs a function expanding operation, the IPMI firmware codes with varieties of functions are written, to provide users much more demands and services, Therefore, the more the demands, the more services the system provider has to provide, and the system provider has a heavy load. But some functions not needed by a part of the users will be still provided for a majority of users, especially for the demanders with special functions and special services. These functions are not all necessary. If they are provided in the same time, the cost and consumption are increased.

In general, if having no special demands, the system provider usually provides to the users an identical set of IPMI firmware codes and exploited functions. If a user has a special demand on a new function, the system provider adds the new function to the IPMI firmware codes, and provides the usage when the system is powered on. However, this new function is likely to limit a part of functions to be operated due to software/hardware characteristics. However, the system provider uses the identical IPMI firmware codes to provide services, resulting that users who do not need new functions have to endure the limitation on the part of the functions, and have to, in accordance with the demands of different users, establish IPMI firmware codes with different needs, thereby generating drawbacks of forming the load on the design cost of the system provider and lacking of versatileness. Moreover; the above-mentioned demands vary with different users, have to provide different new functions, and results that the limitation of function is getting worse. This can not provide the demands of users fast, correctively and efficiently, or can not be applied to different firmware and hardware platform work.

Therefore, how to solve the drawbacks of the prior art and allow users to select conveniently, without any limitation, to use the method and IPMI of function modules provided by the system is becoming one of the most urgent problems to be solved.

SUMMARY OF THE INVENTION

In views of the above-mentioned problems of the prior art, it is a primary objective of the present invention to provide a management function setting method for an intelligent platform management interface (IPMI). The management function setting method is applicable to a computer system having the IPMI, and is compatible with different firmware and hardware platforms. Through the establishment of an IPMI OEM command, the method is capable of enabling or disabling management functions and obtaining function status flags of the management functions. Moreover, by determining the need of users, the method executes the IPMI OEM command to set the function status flags of the management functions, so as to fast, correctly and efficiently set the management functions and satisfy the demands of the users.

It is another objective of the present invention to provide a management function setting method for dynamically setting a plurality of management functions of an IPMI. By using an identical set of IPMI firmware codes, the method allowed users to set a plurality of management functions quickly and efficiently with simple manipulation.

To achieve the above-mentioned and other objectives, a management function setting method is provided according to the present invention. The management function setting method is used for dynamically setting a plurality of management functions of an intelligent platform management interface (IPMI) of a computer system. The method includes (1) modularizing the management functions of the IPMI, and providing each of the modularized management functions a function status flag for indicating whether the modularized management function is enabled or disabled; (2) when the computer system has a basic input/output system (BIOS) to execute a power-on self test (POST) process, enabling needed management functions a user needs among the modularized management functions by changing the function status flags of the needed management functions to indicate the needed management functions are enabled, and disabling the remaining modularized management functions by changing the function status flags of the remaining modularized management functions to indicate the remaining modularized management functions are disabled; and (3) initializing the needed management functions, the function status flags of the needed management functions indicating the needed management functions are enabled.

The function status flags of the management functions are stored in a nonvolatile memory. The nonvolatile memory is one selected from the group consisting of a read only memory (ROM), a flash memory and a ferroelectric memory (Fe-RAM). Through the use of IPMI OEM commands, a system manager is allowed to enable or disable the management functions as he needs.

The function status flags are set be the system manager through the use of basic input/output system.

Therefore, the management function setting method can follow the demands of users to preset the management functions by setting the function status flags of the management functions. By using an identical set of IPMI firmware codes, the method can provide varieties of choices to the users.

Therefore, through the use of the management function setting method, a system manager is allowed to quickly and correctly set the management functions, without the need to set or manufacture too many and too complicated the IPMI firmware codes, thereby omitting the resource consumption and complicated operation and satisfying the demands of users in a very short time.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

Figure 1:
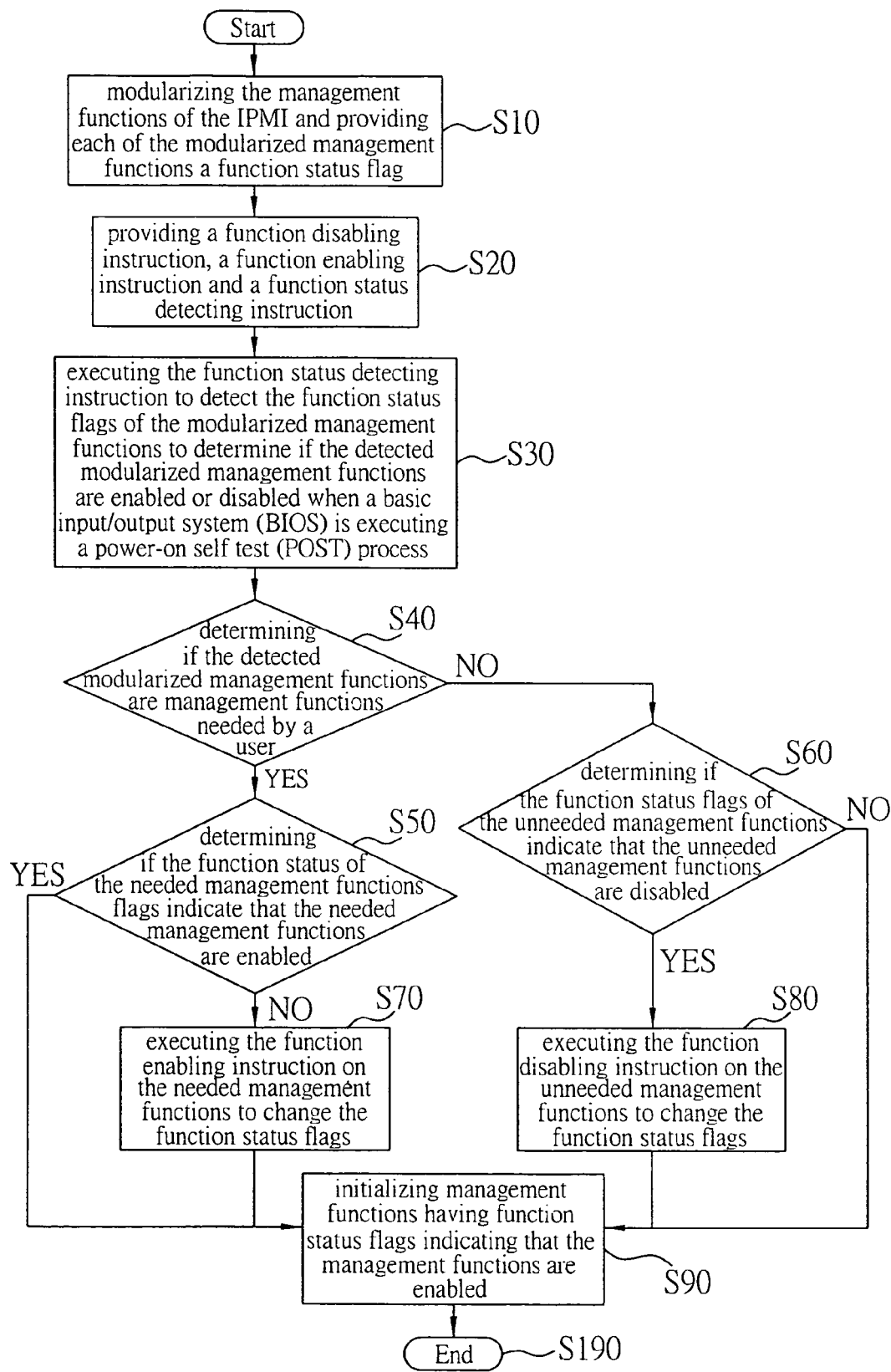
FIG. 1 is a flow chart of a management function setting method for dynamically setting an intelligent platform management interface of the preferred embodiment according to the present invention.

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

FIG. 1 is a flow chart of a management function setting method for dynamically setting a plurality of management functions of an intelligent platform management interface (IPMI) of the preferred embodiment according to the present invention. The method is applicable to a computer system having an IPMI. The method starts in step S10. In step S10, the method modularizes the management functions of the IPMI, and provides each of the modularized management functions a function status flag for indicating if the modularized management function is enabled or disabled. The method then proceeds to step S20.

In step S20, the method provides a function disabling instruction to disable the modularized management functions, a function enabling instruction to enable the modularized the management functions, and a function status detecting instruction to detect the function status flags of the modularized management functions. The method then proceeds to step S30.

In step S30, the method executes the function status detecting instruction to detect the function status flags of the modularized management functions when a basic input/output system (BIOS) is executing a power-on self test (POST) process, so as to determine if the detected modularized management functions are enabled or disabled. The method proceeds to step S40.

In step S40, the method determines if the detected modularized management functions are management functions needed by a user, and if the detected modularized management functions are the management functions needed by the user, the method proceeds to step S50, or the method proceeds to step S60.

In step S50, the method determines if the function status flags of the needed management functions indicate that the needed management functions are enabled, and if the function status flags indicate that the needed management functions are enabled, the method proceeds to step S90, or the method proceeds to step S70.

In step S60, the method determines if the function status flags of the unneeded management functions indicate that the unneeded management functions are disabled, and if the function status flags indicate that the unneeded management functions are disabled, the method proceeds to step S90, or the method proceeds to step S80.

In step S70, the method executes the function enabling instruction on the needed management functions, the function status flags of the needed management functions indicating that the needed management functions are disable, and changes the function status flags from indicating that the needed management functions are disabled to indicating that the needed management functions are enabled. The method proceeds to step S90.

In step S80, the method executes the function disabling instruction on the unneeded management functions, the function status flags of the unneeded management functions indicating that the unneeded management functions are enable, and changes the function status flags from indicating that the unneeded management functions are enabled to indicating that the unneeded management functions are disabled. The method proceeds to step S90.

In step S90, the method initializes management functions having function status flags indicating that the management functions are enabled. The method proceeds to step S190.

In step S190, the method is finished. Therefore, the function status flags of all of the needed and unneeded management functions are changed to indicate that the needed and unneeded management functions are enabled and disabled respectively, and only those of the management functions having the function status flags indicating that the management function are enabled are initialized.

According to the preferred embodiment, the function status flags are implemented by a non-volatile memory, and are set by the user through the inputting of predetermined codes to the BIOS. The non-volatile memory is one selected from the group consisting of a read only memory (ROM), a flash memory and a ferroelectric memory (FeRAM).

Through the implementation of the management function setting method of the present invention, the user is allowed to increase or decrease the use of the management functions of the IPMI as he wants by changing the function status flags, without the need to buy another IPMI.

In contrast to the prior art, the management function setting method of the present invention is provided with a plurality of function status flags, a function enabling instruction, a function disabling instruction and a function status detecting instruction, all of which are used to set a plurality of management functions of an IPMI in accordance with the demands of a user. Through the implementation of the management function setting method, the user does not have to use the unneeded management functions, or endure the problem that some management functions are restricted from execution induced by certain enabled management functions. Moreover, the user is allowed to dynamically enable or disable the management functions quickly and correctly, and a system manager can set the management functions selected by the user in a very time, so as to attain the objectives of satisfying customized demands, reducing manufacturing cost and improve efficiency.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A management function setting method for dynamically setting a plurality of management functions of an intelligent platform management interface (IPMI) of a computer system, the method comprising the steps of:
   (1) modularizing the management functions of the IPMI, and providing each of the modularized management functions with a function status flag for indicating whether the modularized management function is enabled or disabled;
   (2) executing a power-on self test (POST) process by a basic input/output system (BIOS) of the computer system to detect the function status flag, and then enabling one or more of the modularized management functions needed by a user by changing the function status flags of the needed management functions to indicate that the needed management functions are enabled, and disabling the remaining modularized management functions by changing the function status flags of the remaining modularized management functions to indicate that the remaining modularized management functions are disabled; and
   (3) initializing the needed management functions, with the function status flags of the needed management functions indicating that the needed management functions are enabled,
   wherein at least one of the function status flags is set by the user through inputting of predetermined codes to the BIOS.

2. The management function setting method of claim 1, wherein at least one of the function status flags is implement by a non-volatile memory.

3. The management function setting method of claim 2, wherein the non-volatile memory is one selected from the group consisting of a read only memory (ROM), a flash memory and a ferroelectric memory (FeRAM).

4. A management function setting method for dynamically setting a plurality of management functions of an intelligent platform management interface (IPMI) of a computer system, the method comprising the steps of:
   (1) modularizing the management functions of the IPMI, and providing each of the modularized management functions with a function status flag for indicating whether the modularized management function is enabled or disabled;
   (2) executing a power-on self test (POST) process by a basic input/output system (BIOS) of the computer system to detect the function status flag, and then enabling one or more of the modularized management functions needed by a user by changing the function status flags of the needed management functions to indicate that the needed management functions are enabled, and disabling the remaining modularized management functions by changing the function status flags of the remaining modularized management functions to indicate that the remaining modularized management functions are disabled; and
   (3) initializing the needed management functions, with the function status flags of the needed management functions indicating that the needed management functions are enabled,
   wherein step (2) further comprises detecting whether the function status flags of the needed management functions indicate that the needed management functions are disabled, and only enabling those needed management functions having the function status flags detected to indicate that the needed management functions are disabled.

5. A management function setting method for dynamically setting a plurality of management functions of an intelligent platform management interface (IPMI) of a computer system, the method comprising the steps of:
   modularizing the management functions of the IPMI, and providing each of the modularized management functions with a function status flag for indicating whether the modularized management function is enabled or disabled;

(2) executing a power-on self test (POST) process by a basic input/output system (BIOS) of the computer system to detect the function status flag, and then enabling one or more of the modularized management functions needed by a user by changing the function status flags of the needed management functions to indicate that the needed management functions are enabled, and disabling the remaining modularized management functions by changing the function status flags of the remaining modularized management functions to indicate that the remaining modularized management functions are disabled; and (3) initializing the needed management functions, with the function status flags of the needed management functions indicating that the needed management functions are enabled, wherein step (2) further comprises detecting whether the function status flags of the remaining management functions indicate that the remaining management functions are enabled, and only disabling those remaining management functions having the function status flags detected to indicate that the remaining management functions are enabled.

* * * * *